United States Patent [19]

Markus

[11] Patent Number: 5,561,841
[45] Date of Patent: Oct. 1, 1996

[54] METHOD AND APPARATUS FOR PLANNING A CELLULAR RADIO NETWORK BY CREATING A MODEL ON A DIGITAL MAP ADDING PROPERTIES AND OPTIMIZING PARAMETERS, BASED ON STATISTICAL SIMULATION RESULTS

[75] Inventor: Ots Markus, Helsinki, Finland

[73] Assignee: Nokia Telecommunication OY, Espoo, Finland

[21] Appl. No.: 256,669

[22] PCT Filed: Jan. 21, 1993

[86] PCT No.: PCT/FI93/00022

§ 371 Date: Sep. 15, 1994

§ 102(e) Date: Sep. 15, 1994

[87] PCT Pub. No.: WO93/15591

PCT Pub. Date: Aug. 5, 1993

[30] Foreign Application Priority Data

Jan. 23, 1992 [FI] Finland .................................. 920291

[51] Int. Cl.⁶ .................................................... H04Q 7/36
[52] U.S. Cl. ........................... 455/33.1; 455/67.7; 379/59
[58] Field of Search ......................... 455/33.1–33.4, 455/54.1, 54.2, 56.1, 67.1, 67.7; 379/58, 59, 60

[56] References Cited

U.S. PATENT DOCUMENTS 5,179,722  1/1993  Gunmar et al. ................. 455/56.1 X

FOREIGN PATENT DOCUMENTS 0431956  6/1991  European Pat. Off. .......... H04B 7/26
WO9010342  9/1990  WIPO ............................. H04B 7/26

OTHER PUBLICATIONS

Panzer et al., "Adaptive Resource Allocation in Metropolitan Area Cellular Mobile Radio System", *40th IEEE Vechicular Technology Conference*, May 6, 1990, pp. 638–645.

Althoff, Jurgen, "Neue Plannungsansatze fur zellulare Mobilfunknetze. Raum fur Veranderungen", *Nachrichten Elektronik Und Telematik*, Jan. 1991, pp. 22–25.

Straus et al., "Simulation of a Wireless PBX System for Offices", *8th European Conference on Electronics*, Jun. 13, 1988, pp. 383–386.

*Primary Examiner*—Chi H. Pham
*Attorney, Agent, or Firm*—Cushman Darby & Cushman, L.L.P.

[57] ABSTRACT

A method and a system for planning a cellular radio network. The method includes creation of a model representing the cellular radio network and its radio environment on a digital map. The method further includes adding system properties affecting the traffic control process of the cellular radio network to the model representing the cellular radio network and its radio environment for route specific operational simulation of the cellular radio network. The simulation preferably utilizes subscriber mobility models and immobile and/or mobile individual subscribers generated on the digital map. The simulation events are stored separately for each street, location, network element and/or cause. The optimization of the parameters of the cellular network is performed on the basis of the stored information. Simulation of an operating cellular network on the basis of statistical data obtained from the network allows an adaptive control of the system parameters.

12 Claims, 8 Drawing Sheets

METHOD AND APPARATUS FOR PLANNING A CELLULAR RADIO NETWORK BY CREATING A MODEL ON A DIGITAL MAP ADDING PROPERTIES AND OPTIMIZING PARAMETERS, BASED ON STATISTICAL SIMULATION RESULTS

BACKGROUND OF THE INVENTION

The invention relates to a method for planning a cellular radio network, comprising creation of a model representing the cellular radio network and its radio environment on a digital map.

Cellular radio network planning can be divided into coverage, frequency, capacity, parameter and transmission planning. Planning applications based on digital maps have recently been developed for coverage, frequency and capacity planning. Such planning applications enable the modelling of the radio environment of the cellular radio network as a function of location. One example of such planning applications is the Network Planning System NSP/X of Nokia. The operation of the software is based on a mathematical propagation model for calculating the coverages of base stations located on a digital map.

Another example of conventional network planning tools is disclosed in WO 90/10342, wherein radio channels radio are allocated to the cells by utilizing an exclusion matrix presenting the interactions among the cells in the system. The allocation of radio channels is iteratively changed until it is optimal from the point of view interference.

One sub-area of radio network planning, i.e., the definition of network parameters has conventionally been carried out manually, by applying the method of "trial and error". Such network parameters include hand-over parameters, subscriber station and base station power control parameters and frequency hopping parameters. Parameter planning starts by defining a so-called "intelligent guess" for proper parameter values, which are then applied, as such, to the base stations of a planned and established cellular network. Information is then collected on the operation of the real radio network and analysed, and required changes in the network parameters are made on the basis of the analysis, which usually means a new "intelligent guess". A problem with the operational analysis of radio networks is the acquisition of requisite feedback information. The most important sources of feedback information have usually been the statistics of the mobile switching centre and the feedback from the network users. Within the most critical areas of the network, it is also possible to perform actual field strength measurements, on the basis of which one attempts to define proper parameter values. However, this process is extremely slow and laborious, and the network performance to be obtained by it is only satisfactory.

Careful parameter planning thus always requires a good knowledge of the local radio environment of the real cellular network as well as reliable estimations of the effects of the different control parameters in the heterogeneous radio environment typical of cellular networks. Problems associated with the parameter planning have become more concrete with the introduction of dense micro-cell networks. In addition, the parameter planning will become even more important with the introduction of GSM mobile networks, which is due to the decreased cell size and the more diversified and more complicated control algorithms. Therefore, the effect of control parameters on the performance of real cellular radio networks will be a matter of great importance.

SUMMARY OF THE INVENTION

The object of the invention is a method and a system for planning a cellular radio network, which not only offers more efficient parameter planning than previously was available, but also enables full operational analysis on the basis of which the performance of the cellular network can be optimized.

This is achieved by means of a method according to the invention, which is characterized in that the method further comprises adding of system properties affecting the traffic control process of the cellular radio network in connection with a model representing the cellular radio network and its radio environment for route-specific operational simulation of the cellular radio network, and optimization of the parameters of the cellular radio network and full operational optimization of the cellular network on the basis of statistical simulation results describing the operation of the network.

The invention is based on the idea that the operational simulation of cellular radio networks is transferred to a heterogeneous cellular and radio environment modelled separately for each network on a digital map. By adding the subscriber mobility models and the system features of the radio network to be simulated to the real cellular radio network created on the digital map, a practical simulation concept is achieved by means of which the operation of the real cellular network can be analysed through simulations in various conditions and with various parameter combinations. Network control functions occurring during an operational simulation performed in the artificial network and radio environment are stored and the obtained statistical information about the operation of the network can be subsequently utilized as feedback data, so as to localize the critical areas of the radio network to be simulated, and to alter the network parameters at least in these areas. The effect of the altered parameters can be tested immediately by performing a new operational simulation and analysing the operation of the network on the basis of the obtained statistical information. This kind of iterative proceeding enables an optimal adjustment or tuning of the network structure and parameters even before the real network has been established. The method according to the invention can also be applied in existing networks for the analysis of the interdependence between the cell-specific traffic control parameters and the heterogeneous (local) radio environment of the real cellular network. In place of the calculated field strength values, it is thereby also possible to utilize field strength values measured from the real network.

In the preferred embodiment of the invention, simulations are realized by individual subscribers, which enables making a many-sided collection of information and further applications. The simulation functions can be stored separately for e.g., each street, site, network element or cause. Active subscribers are generated by random processes based on the predicted or actual call statistics of the radio network to be simulated and/or on the subscriber penetration. The generated subscribers may be relatively immobile, such as handportables, or they may move within the area of several cells during the call, as is typical of vehicular stations. Mobile subscribers can be generated e.g., by random processes based on street-specific traffic statistics, and they can be used for simulating load effects caused by subscriber traffic and call control procedures.

The invention also relates to a system for planning a cellular radio network, comprising an interactive means for creating a model representing the cellular radio network and its radio environment on a digital map comprising terrain and topology information, the model comprising at least base station locations and antenna locations, antenna powers and antenna directions thereof, so defined that radio coverage areas calculated on the basis of a predetermined radio signal propagation model and the information provided by the digital map cover entirely a desired geographical area. The system is characterized in that it further comprises a means for generating active subscribers to be positioned on the digital map and radio links established by the active subscribers for simulating the model;

a means for determining at least field strength and interference conditions at each location point of each generated active subscriber during the radio link in the model of the radio environment created on the digital map; a means for simulating system functions associated with the base station selection, base station change, channel allocation and active connection control of the subscribers generated by the generating means on the basis of the determined field strength and interference conditions and in accordance with the selected system control algorithms and parameters of the cellular radio network; a means for storing the event data of the functions performed by the simulating means; and means for changing the system control parameters on basis of the simulation results.

One aspect of the invention is a control system for a cellular radio network, comprising means for obtaining statistical data of operation of an operating cellular network and means for altering control parameters of the cellular network on the basis of the obtained statistical data. According to the invention, the means for altering the control parameters further comprise:

means for storing a model of the cellular radio network and its radio environment on a digital map comprising terrain and topology information, the model comprising at least base station locations and antenna locations, antenna powers and antenna directions of the cellular network, a means for generating active subscribers on the digital map and radio connections established by the active subscribers according to the statistical data obtained from the operating cellular network, a means for determining at least field strength and interference conditions at each location of each generated active subscriber during the radio link in the model of the radio environment created on the digital map;

a means for simulating system functions associated with the base station selection, base station handover, channel allocation and active connection control of the subscribers generated by the generating means on the basis of the determined field strength and interference conditions and in accordance with the system control algorithms and parameters of the cellular radio network;

a means for storing the event data of the functions performed by the simulating means, and means for changing the system control parameters on basis of the simulation results.

BRIEF DESCRIPTION OF THE DRAWINGS

In the following the invention will be described in more detail by means of embodiments with reference to the attached drawings, in which.

DETAILED DESCRIPTION

Figure 1:
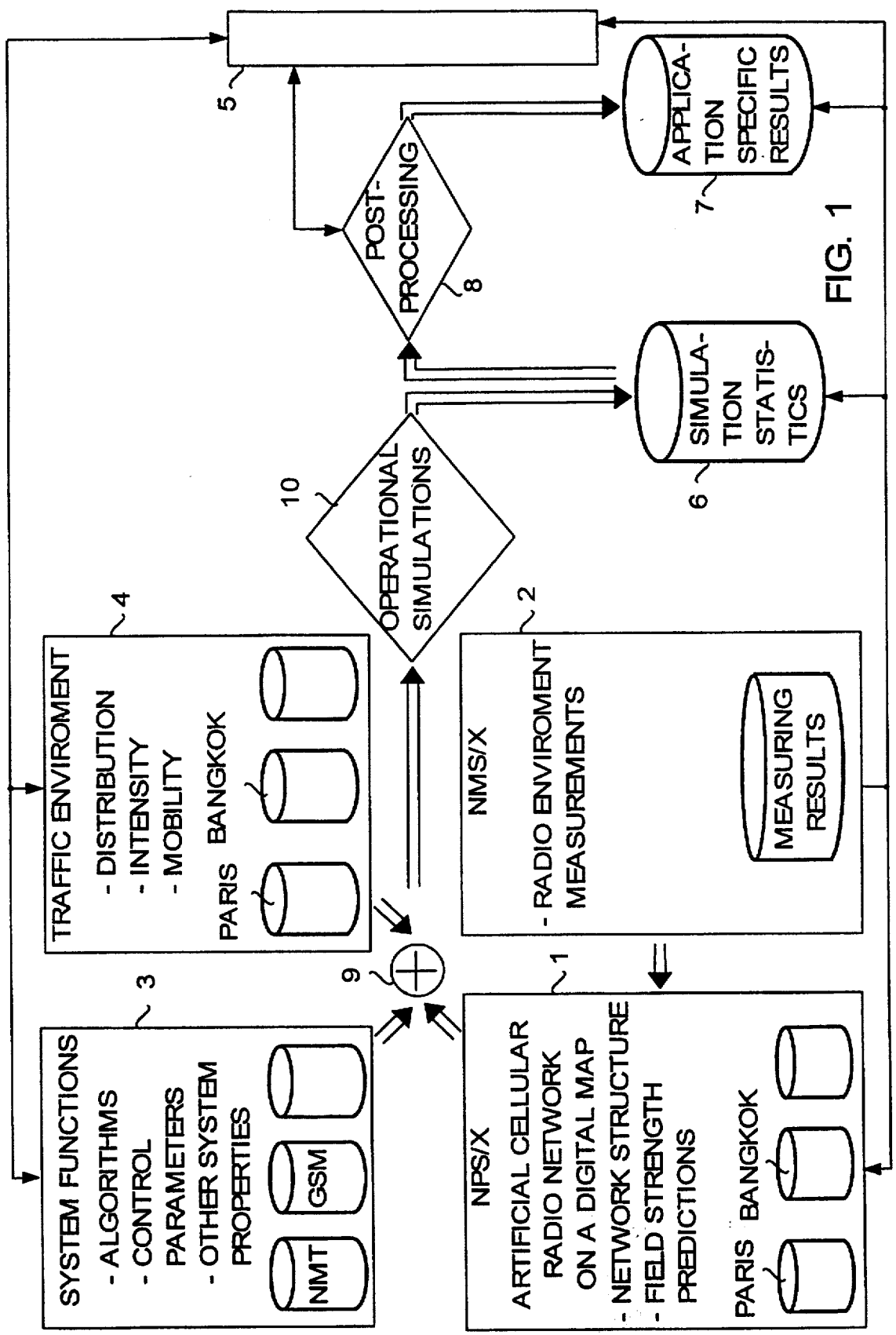
FIG. 1 shows a flow chart illustrating the most important aspects of the planning method according to the invention.

The main principle of the planning method and system according to the invention can be understood most easily from the combined block diagram and flow chart of FIG. 1. In FIG. 1, functions of a certain type are grouped into separate blocks so as to obtain a modular structure which is not necessary but usually very advantageous as it enables the utilization of the same method and system in the operational simulation and analysis of almost all cellular type systems and networks. The principal features of each block will be described below.

Block 1 is an interactive software package for network design, which forms the basis of the network planning. It provides for the creation of the structure of the network to be simulated and a model representing its actual heterogeneous radio environment on a digital map. The digital map is a prerequisite for computerized network planning and it usually provides information about the area under planning concerning at least the topography (height of terrain), type of terrain, and roads/streets. By employing the software of block 1, the operator positions the base stations of the cellular network on the digital map and calculates the coverages of the base stations by means of a mathematical propagation model included in the software.

In the preferred embodiment of the invention, the functions of block 1 are realized by the Network Planning System NPS/X of Nokia Telecommunications Inc.

The planning system may also contain the practical measuring system shown in block 2, such as the Network Measuring System NMS/X of Nokia, for performing practical measurements in actual terrain and in the network, and the results so obtained (e.g. field strength values) can be used as feedback information in the network planning.

Subscriber traffic required for the simulation of the cellular radio network and its radio environment created in block 1 is created and controlled in block 4. The subscriber traffic may consist of deterministic moving of one subscriber or random type mass traffic. In the former case, simple route calculation is mainly employed, and no special mobility models are needed. Mass traffic provides for the modelling of the load effects caused by the subscriber mobility in the cellular network, which requires that the subscriber mobility and the local traffic intensity be modelled.

The system-specific properties of the cellular radio network to be planned in each particular case are found in block 3. Block 3 contains the system-specific call control algorithms with their network-element specific parameters and other possible system properties affecting the radio environment. The purpose of block 3 is to monitor the state of the radio environment as a function of the moving of the subscribers generated on the digital map, and the performance of functions simulating the required network control procedures. In this description, the primary emphasis will be given to properties specific to the GSM cellular radio system; however, by modifying the contents of block 3, the planning system of FIG. 1 can be easily adopted to the planning and simulation of the NMT cellular radio system or some other system.

The simulation concept according to the invention is obtained when subscriber traffic is generated by means of block 4 in the radio network and its heterogeneous artificial radio environment created on the digital map in block 1, and the system specific functions of block 3 are applied to the above-mentioned operating network, as illustrated by elements 9 and 10 in the flow chart of FIG. 1. Network control events that occur during the simulations (block 10) are stored as simulation statistics in a database 6. Simulation can also provide real-time graphic representations, but the actual utility applications are usually realized by processing the simulation statistics stored in the database 6 in block 8 by special further processing programs, so as to obtain desired application-specific results.

The system further comprises a graphic interactive user interface 5 for performing the network planning of block 1 and subsequent changes (in power levels, for instance); for performing the initial definitions and changes (such as parameter selections) in blocks 3 and 4; for starting the simulation; possibly for monitoring graphically the simulation in real-time; for initializing and starting the further processing programs; and for displaying the obtained results on a graphic display. The interactive graphic user interface 5 naturally usually comprises a high-resolution color graphics display, a keyboard and a mouse.

In the preferred embodiment of the invention, the system runs on a Sun workstation and the user interface is implemented on top of Sun View, which is a system supporting interactive, graphics-based applications running within windows.

As mentioned above, block 1 contains digital map information about the area to be planned, i.e. a digital map. There are different types of information that can be digitized and used for the coverage predictions. The most important information types from the point of view of network planning are topography (terrain heights), area types, roads, and traffic density. There also exist various ways of data presentation, but the raster format seems to be the most suitable. The map area is thereby divided into raster units (area pixels), which may be rectangular or square-shaped, each typically representing a size of 50 m–500 m, in cellular radio applications. For the micro-cell modelling, which is required in dense urban environments, more information and higher resolution maps should be used. Information about the buildings and streets is essential, so that a pixel representational size of about 10 m is reasonable. The streets can be stored in vector format.

The operator positions the network elements, primarily base stations BS, at desired locations on the digital map, and determines their antenna location, antenna power, antenna direction and frequency allocation. The object is to attempt to find optimal locations and parameters for the base stations, so that the coverages of the base stations cover the desired area completely with appropriate overlapping. The purpose of frequency planning is to determine a frequency re-use pattern to be applied, and then base station-specific frequency groups so as to minimize the level of network interference (and to meet the capacity requirements). Capacity planning defines the number of base station-specific channels so that local capacity requirements are met (this has a certain connection with the frequency re-use pattern).

The coverage of a cell is an area within which the field strength of the base station exceeds a predetermined threshold value. In the invention, the coverage predictions of the base stations positioned on the digital map are determined by a special radio signal propagation model, such as the Okumura-Hata model, utilizing the topography and area-type information of the numeric map and various system-specific calculation parameters. In this way, a field strength matrix is calculated for each area pixel of the digital map, containing a predicted value of the field strength of each base station positioned on the map at the location. Values representing signal strengths are obtained directly from the above-mentioned matrices, by converting the field strength values into dBm values.

Figure 2:
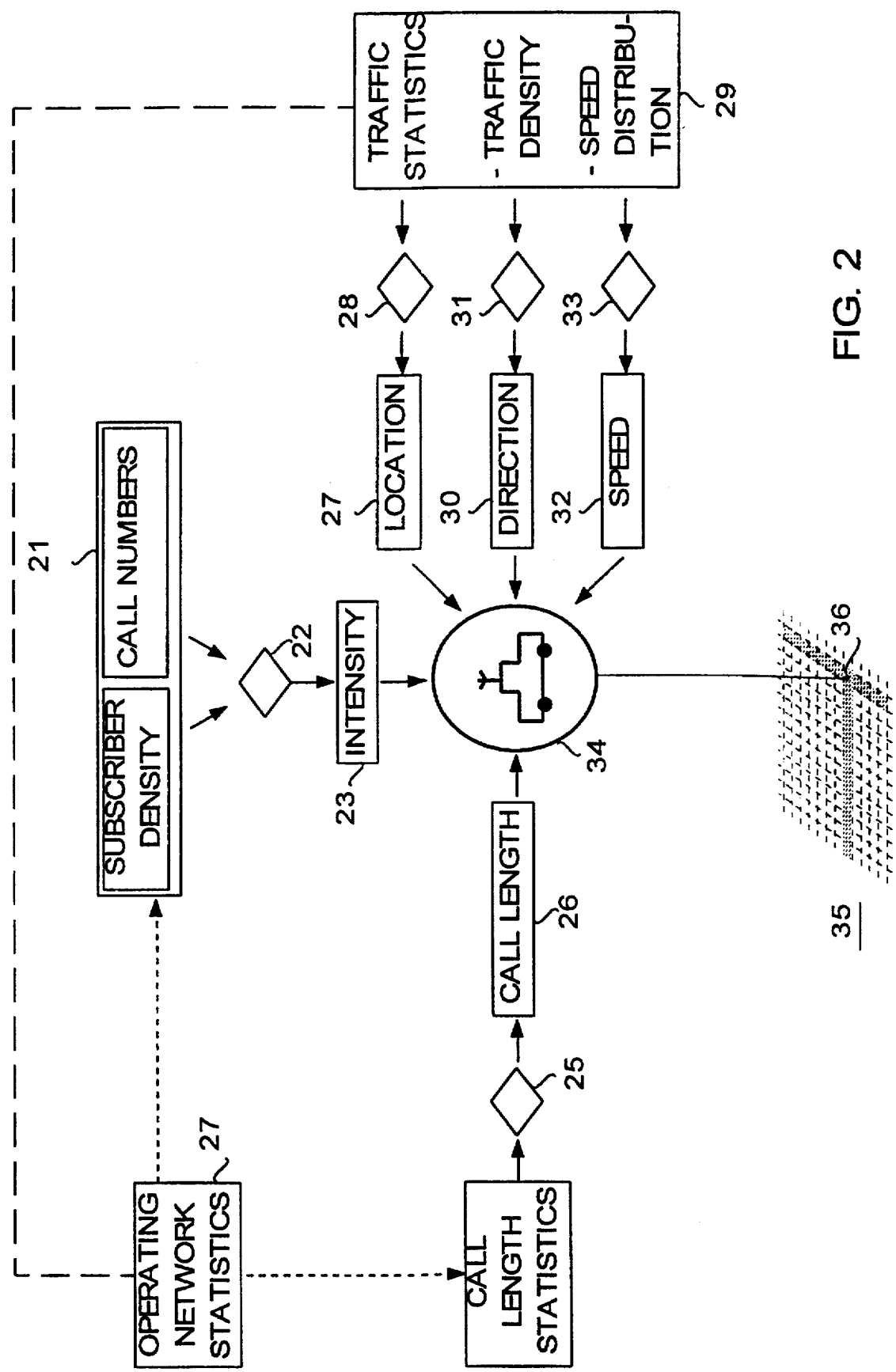
FIG. 2 shows a flow chart illustrating a traffic generation process according to the invention.

Traffic generation performed by block 4 is illustrated by the flow chart of FIG. 2. In the preferred embodiment of the invention, the simulation is realized by individual subscribers. Typically, the subscriber equipments of a cellular radio network can be divided into vehicular stations and handportables. On the basis of these equipment types, the radio network subscribers can be further divided into two groups, which differ from each other mainly in mobility. Handportables are usually relatively immobile, while vehicular stations may move within the area of several cells during a single call.

Due to the constant mobility of the vehicular stations the system has to perform active call control procedures in order to maintain a call. To simulate these procedures and at the same time the load effects of the subscriber traffic, a traffic model has been developed for the vehicular stations, which realizes the generation of active calls, and controls the moving of the subscribers. Block 21 in FIG. 2 contains information about the local penetration of the subscriber equipment and statistics on the number of calls (such as number of calls per subscriber equipment), on the basis of which the intensity of the calls to be generated (block 23) is determined by an appropriate random process (block 22). Block 24 contains call length statistics, on the basis of which the duration of each call (block 26) is determined by another random process 25. Block 29 contains e.g., statistics on street-specific traffic amounts (traffic density, speed distribution, etc.), on the basis of which the location on the digital map (block 27), direction of propagation (block 30) and rate of propagation (block 30) are determined for each call by random processes 28, 31, and 33. In this way, active subscribers moving independently in a predetermined direction, at a predetermined rate, in a digitized street network 36 of the digital map 35, can be generated by combining (in block 34) the information from the blocks 33, 26, 27, 30 and 32. When the active mobile subscriber arrives at a node (i.e. crossroads), a new direction and propagation rate are selected (blocks 27, 30, 32 in relation) to the subscriber by the random processes 28, 31 and 33. This is continued until the time given to the call length in block 26 has elapsed and the call is released.

The resolution of the digital map is typically 50×50 m, and so it can be expected that the hand-portables remain in the same area pixel throughout the call. It can then be further expected that the load effects of the handportables appear mainly as dynamic background load dependent on time and location. If required, the local intensity of this background traffic can be determined by means of the local density of the handportables, the call statistics, and special area specific weighting coefficients. Such area-specific weighting coefficients may be dependent on e.g., the population density and the area type (industrial/business/residential). Moreover, special areas, such as fair areas and airports should be taken into account separately.

Various additional features can be added to the traffic model based on individual subscribers and random processes, if desired. For example, a traffic light control simulation can be added to the above-mentioned crossroads behavior, and so it is also possible to model traffic congestion at the cross-roads. On the other hand, the addition of these features requires new random processes, which may slow down and complicate the simulations, whereas the benefits to be obtained may remain rather marginal. In fact, the basic structure described above can be considered to enable a sufficiently accurate modelling of the subscriber mobility effects in the cellular radio network.

When simulating an existing operating network, the statistics of the blocks 21, 24 and 29 can be updated by the statistics of the operating network, as illustrated by block 37, so as to continuously tune-up the mobility model.

Figure 3:
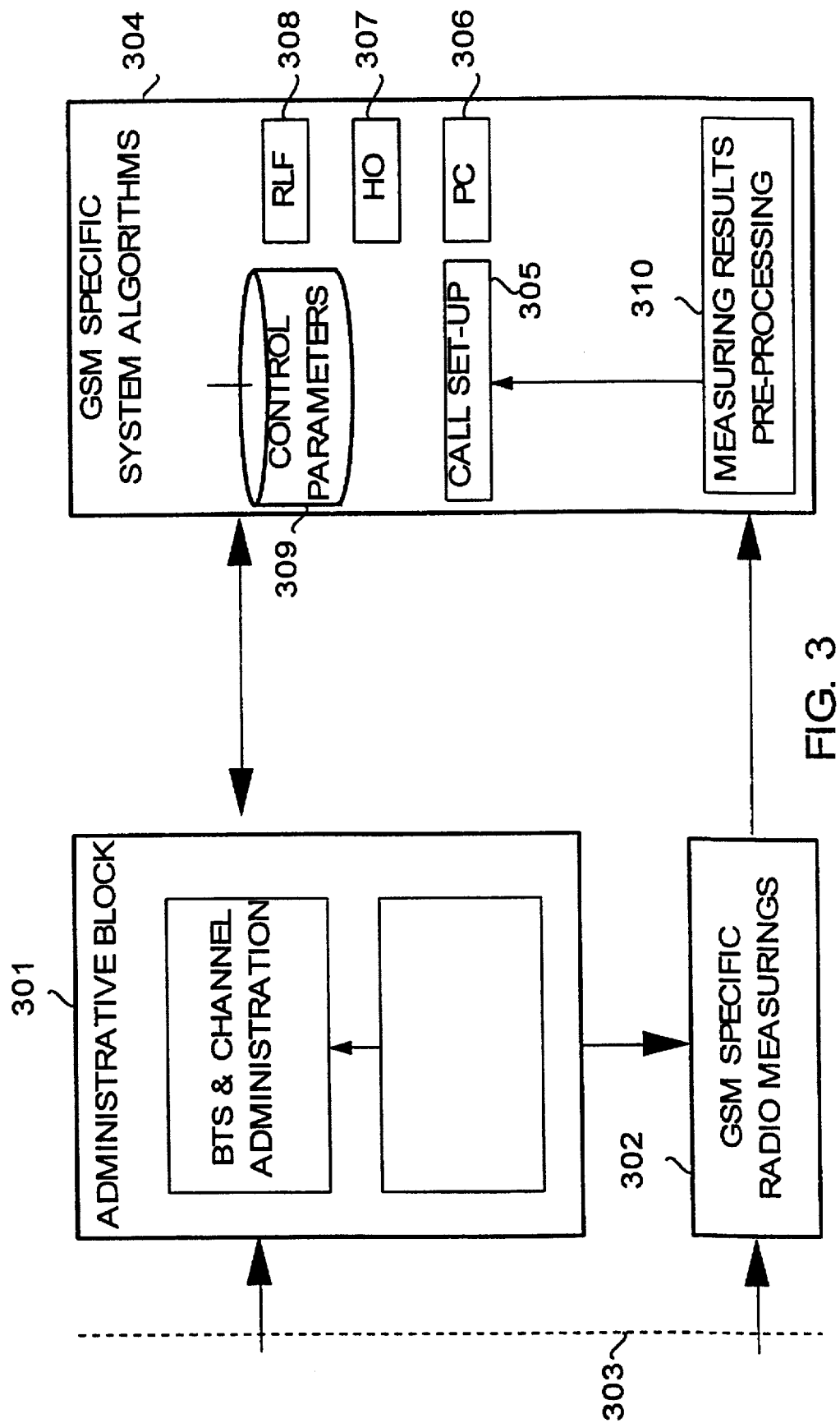
FIG. 3 is a more detailed block diagram of the system block of FIG. 1.

FIG. 3 shows a more detailed operational block diagram of the system block 3 of FIG. 1, using a GSM/PCN network as an example. To facilitate understanding, the operation and parameters of the GSM network will be described first. The GSM network comprises more parameters than conventional analog networks, such as NMT. The basic parameters of each base station BTS are stored in a base station controller BSC. Among the most important parameters from the point of view of network planning are the power levels of the subscriber equipment MS and the base station BTS, i.e. the RF power control strategy. Planning these power levels involves optimizing the RF power output from the MS and the BTS while ensuring that the required power is sufficient to support adequate speech quality. The BTS controls the speech quality and sends the measuring results received from the MS and its own measuring results to the base station controller BSC in each SACCH multi-frame period (480 ms). If the quality of speech is not acceptable, the BSC searches for potential base stations (cells) for the hand-over. The cell selection and hand-over decisions are based on the above-mentioned measuring results and various parameters. Such parameters include the received level and the reception quality. The BSC can maintain a table of up to 32 neighboring cells for each BTS and store the levels as they are received. The BSC performs the intra-BSC hand-overs autonomously. If there is an inter-BSC hand-over to be performed, the BSC sends a list of preferred cells to the mobile switching center MSC, and the MSC performs the hand-over according to the list. Generally, the power control, for both the BTS and the MS, runs independently and in parallel with the hand-over process, but in some cases the power control has connections with the hand-over process. For example, a hand-over would be a better choice than a power increase if some of the neighboring cells allows communication with a lower transmission power level. With a proper choice of power control (PC) and hand-over (HO) thresholds, the BSC will maintain call quality by means of the power control, and will propose a hand-over only when the subscriber equipment MS actually reaches the border of the serving cell. If both the HO and PC threshold conditions are fulfilled, the hand-over has a greater priority than the power control. In cases where the hand-over cannot be made, the power increase may be used as a first aid action.

In the measuring block 302 of FIG. 3, the GSM-specific sampling functions are performed in order to specify a local field strength and interference environment. The measuring block has an interface 303 to the traffic block 4 and the NPS/X block 1 of FIG. 1. The measuring block 302 receives information about the current location of the generated active subscribers on the digital map from the block 4. The field strength values of the six strongest base stations in the area pixel of the digital map in which the active subscriber is located are obtained directly from the field strength matrix of this particular area pixel, which matrix is found in the block 1, as well as the frequency scheme of the network to be planned and the location data of the base stations.

The above-mentioned frequency scheme of the network to be simulated forms a basis for the interference measurements performed by the block 302. The frequency scheme is employed to identify possible interfering base stations and other similar location-specific field strength values obtained from the field strength matrix of the area pixel. The local signal quality can be estimated by means of a carrier/interference (C/I) analysis performed in each area pixel. A corresponding bit error ratio value BER and a signal quality classification can also be determined on the basis of the C/I analysis. This can be done by comparing the carrier of a specific channel, with the carrier of an adjacent channel or with the signals of other base stations utilizing the same channel in the same network. The interference determination is performed by means of base station-specific field strengths calculated in the area pixels of the digital map by checking the ratio between each base station pair in each area pixel. Interfering base stations are determined on the basis of the frequency scheme, taking into account, e.g., all base stations utilizing the same frequencies as the base station dominating in this particular area pixel. To minimize unnecessary calculation, a threshold value can be determined, on the basis of which only the strongest interfering base stations are taken into account.

In practice, an instantaneous interference situation is, of course, dependent on the state of the interfering base stations and channels and on the influence of the power control. These features can be allowed for during simulation by allocating a specific channel for each generated call—in accordance with the frequency scheme and the channel tables—in conjunction with locking to the base station. In this way, only the interference effects caused by the active channels are taken into account in the interference analysis. The effects of dynamic power control can be taken into account by performing the required summing and substraction procedures of the decibel values in connection with the adjustments. Measurements between the subscriber equipment MS and the base station BTS further require distance data between the MS and the BTS, which can be determined on the basis of the distance between the location of the base station BTS and the current area pixel of the subscriber equipment.

The block 301 includes the system functions associated with the channel control. The purpose of the block 301 is to control the channel allocation in conjunction with the lockings to the cells and hand-overs, and to control the instantaneous sampling performed by the measuring block 302 on the basis of the channel state data. For this purpose, the control block 301 maintains base station-specific channel tables, which store channel allocation and state data, e.g., if the channel is free or busy. In addition, the block 301 may contain extra system algorithms, such as discontinuous transmission or frequency hopping, as it controls the interference measurement, and the concrete effects of these functions can be seen primarily in the channel-specific interference analyses.

The block 304 comprises the system functions to be simulated, including especially the algorithms associated with the cell selection and the active connection control, which can be modified by the operator via the user interface 5. In this specific case, the block 304 contains such system-specific algorithms as the call set-up algorithm 305, the power control algorithm (PC) 306, the hand-over algorithm (HO) and the radio link failure algorithm (RLF) 308. The different control parameters associated with the algorithms are stored in a data base 309, in which the operator can modify them via the user interface 5. The block 304 further comprises a pre-processing 310 for samples collected by the measuring block 302. The pre-processing provides identification codes representing the state of each connection. At the time of call set-up, the subscriber generated by the traffic block 4 on the digital map is locked, under the control of the call set-up algorithm 305, to a cell (base station) having the greatest field strength value in the area pixel in which the subscriber is located. The power control and channel change identification codes produced by the pre-processing 310 from the measuring results of the measuring block 302 are compared continuously with corresponding base station specific control parameters stored in the data base 309 in accordance with the power control algorithm 306 and the channel change algorithm 307. According to the RLF algorithm 304, the call is considered to be interrupted, if the quality of the connection remains below a predetermined threshold value for a sufficient period of time. The block 304 continuously exchanges channel state and allocation data with the control blocks 301.

As the primary function of simulation is to collect information about the operation of the network for subsequent analysis, the system functions performed during the simulation and their background information, such as the measuring results of the block 302 and the identification codes formed on the basis thereof, are stored in the simulation result database 6 of FIG. 1 as comprehensively as possible. Especially, the use of individual subscribers in the simulation offers a possibility of extremely diversified collection of data and further applications. The storing of the different simulation events can be e.g., street specific, location-specific, network element-specific or cause-specific. Simulation events to be stored include, at least, call set-ups, call releases, link failures, power controls and change changes.

Even though it is also possible in the system according to the invention to realize follow-up during the simulation, the actual utility applications of the simulation are accomplished by post-processing the event statistics stored in the database 6. The aim is to screen-out relevant information, which can be performed by post-processing programs illustrated by the block 8 in FIG. 1. They can be classified according to their degree of advancement, as follows: graphics applications, analysing applications, and optimizing applications.

Figure 4:
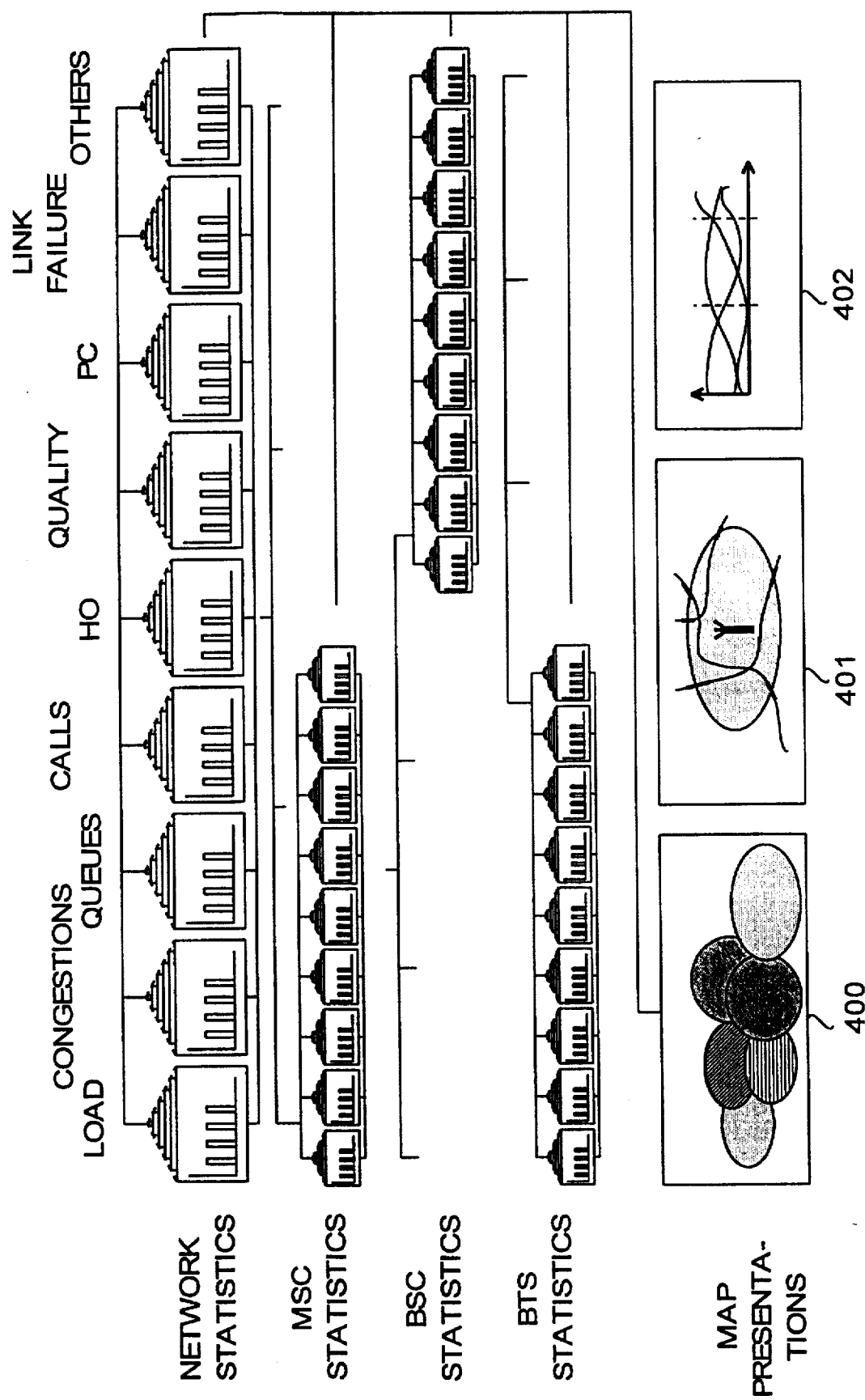
FIG. 4 is a diagram illustrating the presentation of statistical simulation information to the different system components of the cellular network.
Figure 5A:
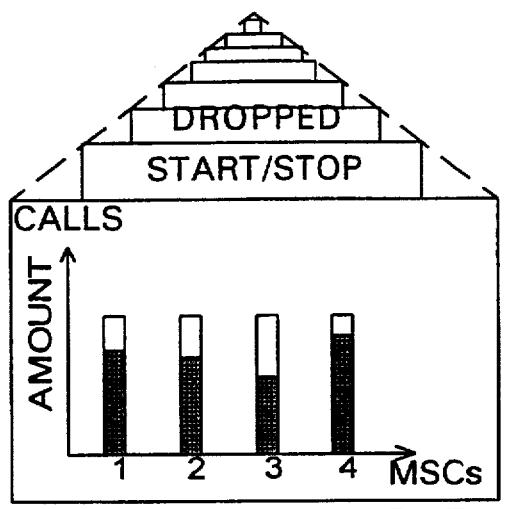
FIGS. 5a to 5f are graphic outputs for the presentation of statistics on the number of calls, quality of calls, and number of hand-overs on a graphic user interface, for instance.
Figure 5B:
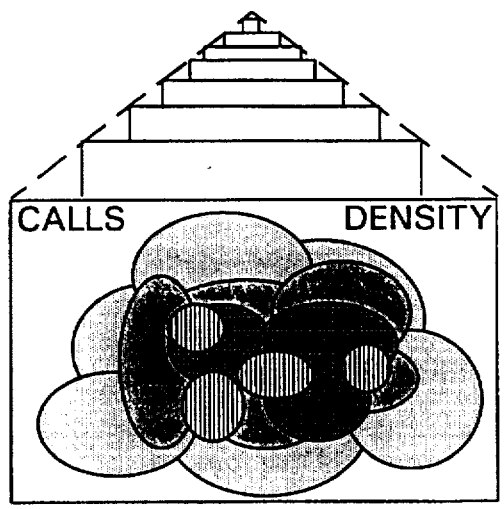
Figure 5C:
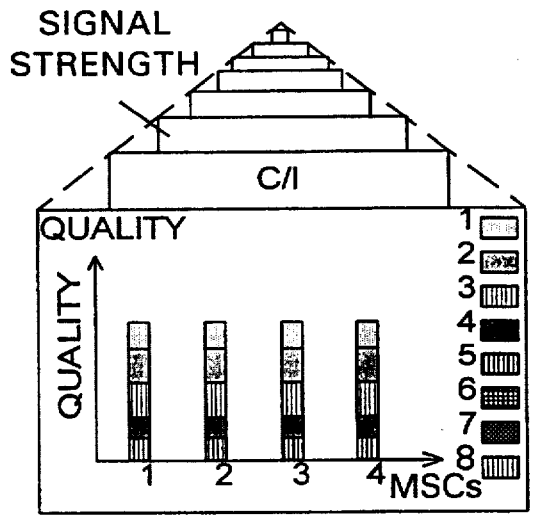
Figure 5D:
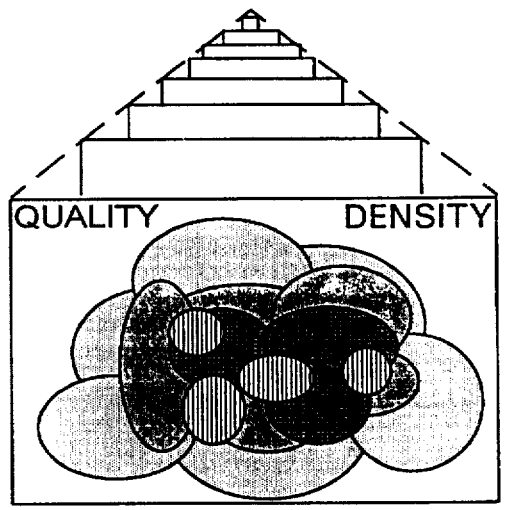
Figure 5E:
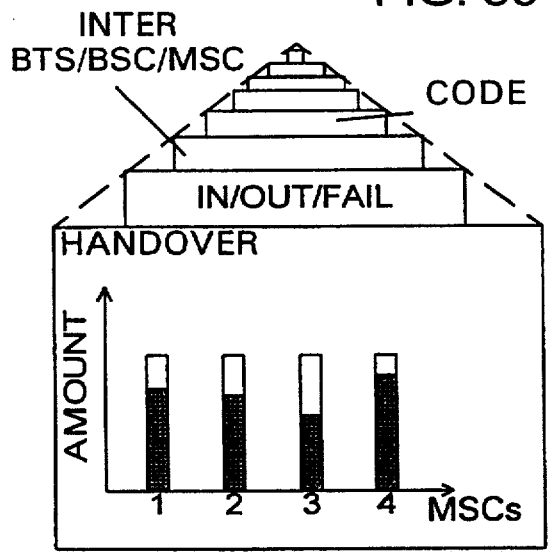
Figure 5F:
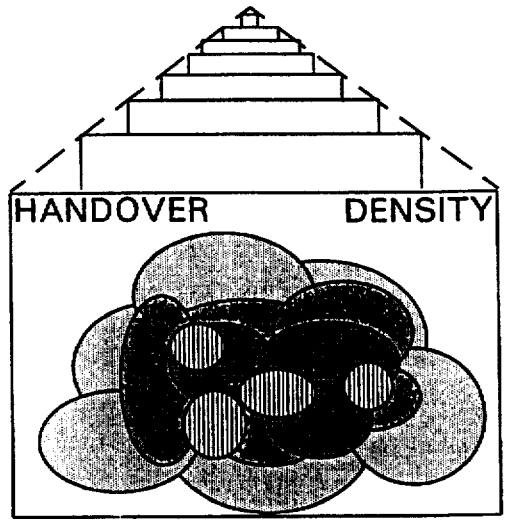

Graphics applications aim at processing the event statistics created during the simulations into visual graphic representations. FIG. 4 shows a hierarchical diagram of post-processed graphical representations which the operator can, for instance, select and output to a graphical user interface. The uppermost horizontal row in FIG. 4 shows statistics on the entire network by means of histograms, wherein each column in each histogram represents one mobile switching center MSC, for instance. The height of the column in each column diagram can, in turn, represent traffic load, number of blocked calls, number of queueing calls, total number of calls, number of channel handovers, call quality, number of power controls, number of link failures, etc., in the respective mobile switching center MSC. The second horizontal row in FIG. 4 shows the corresponding histograms for the base station controllers BSC controlled by the specific MSC, the third horizontal row for the base stations controlled by the specific BSC, and the fourth horizontal row shows histograms representing specific base stations. The simulations statistics can also be presented as graphic map presentations, as illustrated by the bottommost row in FIG. 4. The block 400 illustrates e.g., events per area unit, the block 402 the distribution of the events on a certain route, and the block 402 illustrates events as a function of the radio environment on a certain route.

Similar graphic representations are also shown in FIG. 5. FIG. 5a illustrates the number of calls in the different mobile switching centers, and FIG. 5b illustrates the call density in different network areas as a map presentation. FIG. 5c shows the number of calls of different qualities in each mobile switching center by means of histograms, and FIG. 5d illustrates the distribution of calls of different qualities as a map presentation. FIG. 5e illustrates the number of channel changes for each MSC, and FIG. 5f illustrates the distribution of channel handovers as a map representation.

Figure 6A:
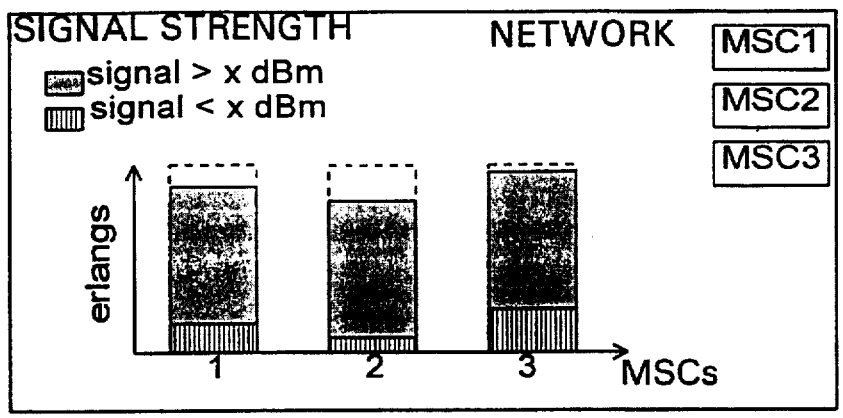
FIGS. 6a to 6f show an example of the principal features of a manual analysis of a cellular network on the basis of the graphic representations of operational statistics.
Figure 6B:
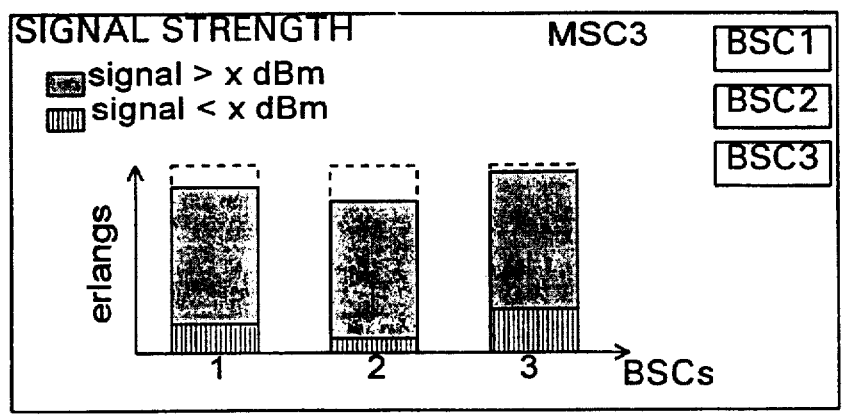
Figure 6C:
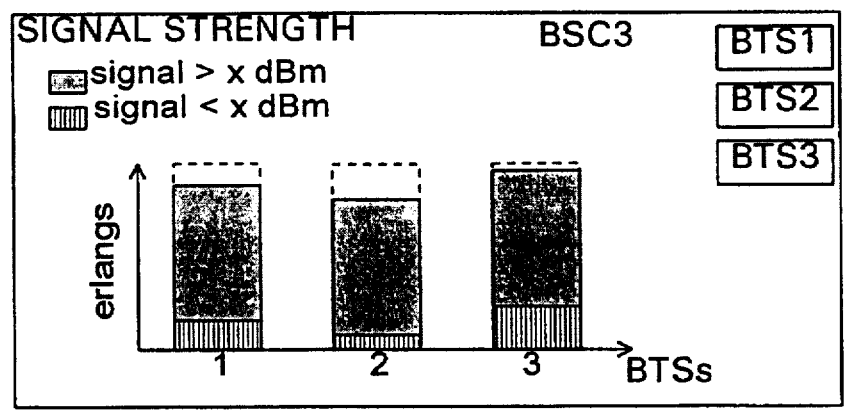
Figure 6D:
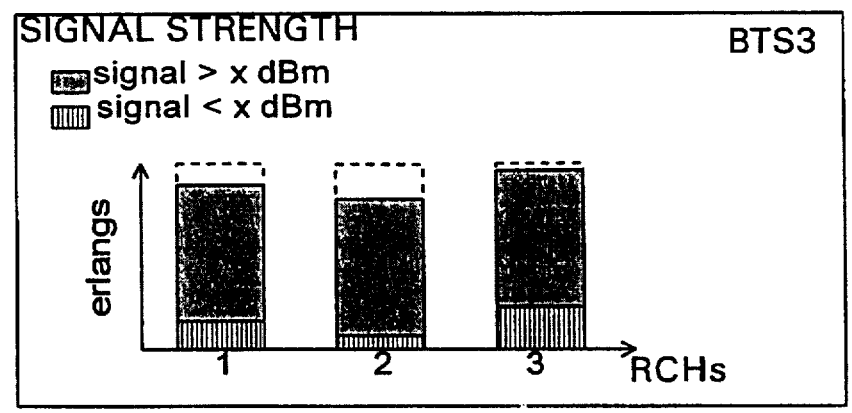
Figure 6E:
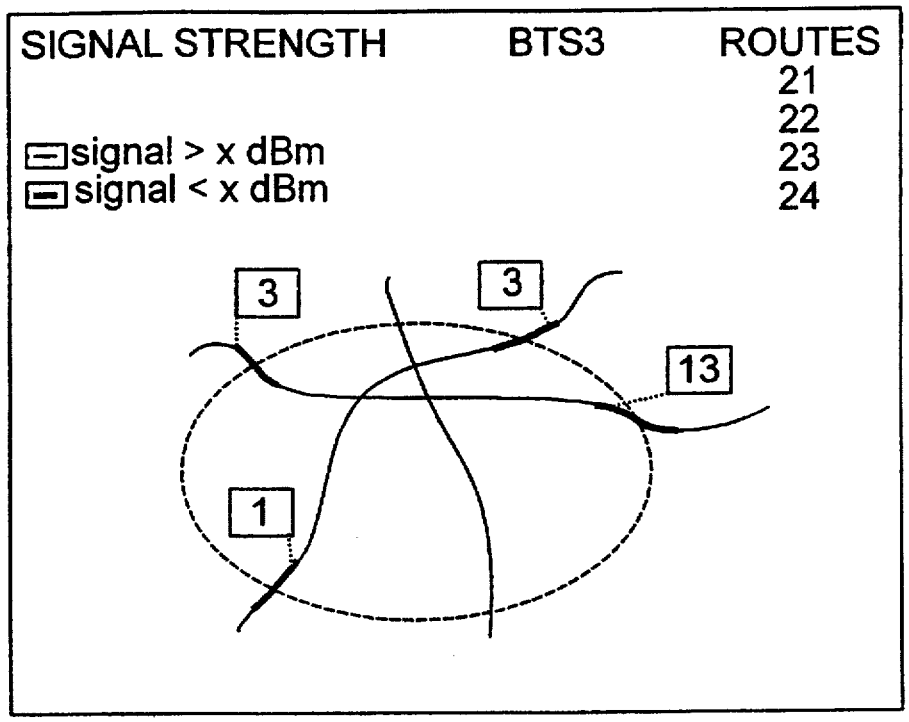
Figure 6F:
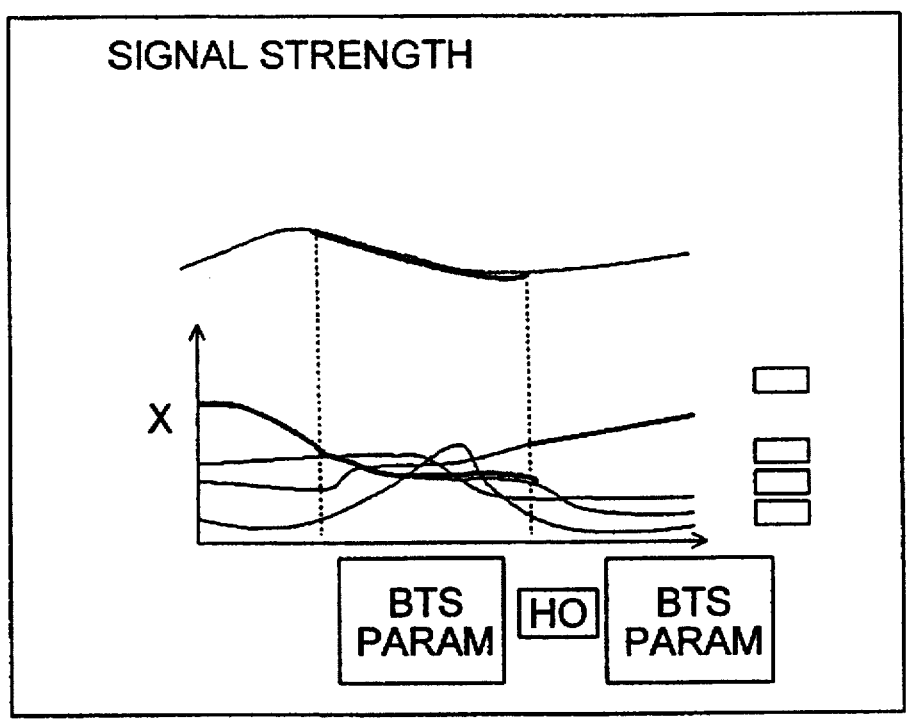

This kind of event specific presentations enable there to be made a systematic evaluation of the relative performance of the different portions of the cellular network or the individual network elements on the basis of different criteria. FIG. 6 shows an outline of a practical embodiment, in terms of which the operation of the different network elements can be evaluated on the basis of the field strength distribution of the call traffic delivered by them. FIG. 6a shows a histogram illustrating the number of calls having a signal strength less or more than x dBm, separately for each MSC. It appears from FIG. 6a that the number of connections of inferior quality is relatively high at the MSC3. By selections made by the operator through the user interface 5, lower hierarchical levels in the network can be reached (FIG. 4), and so it can be seen that the poor connections are concentrated in the base station controller BSC3, among the base station controllers BSC of the mobile switching center MSC3 illustrated in FIG. 6b. Upon examining the base stations under the control of the BSC3 by means of the graphic representation of FIG. 6c, it is further to be seen that the poor connections are concentrated at the base station BTS3 and therein especially on the radio channel 3, as appears from the histogram of FIG. 6d. The signal strength of the base station BTS3 on different routes can then be studied by means of the map presentation of FIG. 6e. FIG. 6f shows variation in the signal strength at different sections of the routes shown in FIG. 6e. By means of this information, one can attempt to change the structure, powers or parameters of the network through the user interface 5 so that an adequate signal strength can be achieved in the discovered critical areas. The effect of the new set values is then tested by a new simulation, whereafter the set values are, perhaps again, changed on the basis of the results obtained, etc. By proceeding iteratively in this way, the network parameters and set values can finally be optimized.

Analysing applications are independent application programs the purpose of which is to analyse the statistical information provided by the simulations. The software may, for instance, compare the simulation results with predetermined limit values and output any detected deviations to the operator through the user interface. On the basis of the results of the analyses it is possible to, e.g., "blacklist" the network elements evaluated as the most critical from the viewpoint of the performance criteria applied in each particular case. The analysis programs can also be classified into similar event-specific application fields as the above-mentioned graphic representations, and so problems associated with the operation of typical cellular networks can be identified and localized by means of them. One simple embodiment is a program which performs the analysis shown in FIGS. 6a to 6f, and then outputs a list of base stations estimated to be the most critical in view of the field strength distribution. The determination and performance of the actual correction procedures still remains to be done by the operator, through the user interface 5.

Optimizing applications represent the most advanced level of further processing software. These application programs analyse the operation of the network autonomously and then define proper control procedures for optimizing the operation of the network. Optimization is usually attempted to be performed by correcting the network configuration, and so the adjustment of, e.g., the base station parameters and the channel change control parameters of the net- work is of primary importance. The programs operate iteratively, that is, the values of the control parameters affecting the event under adjustment are adjusted after each analysis. Thereafter, a new simulation run is performed and the analyses are repeated. This is continued until the performance criteria set by the operator or the general termination criteria defined for the program (number of iterations or performance time of the program) are met. The optimizing applications can also be classified similarly as the graphic applications. One practical embodiment is a program for optimizing cell areas and channel handovers, which searches for short-term channel change situations, for instance, and studies whether they are necessary for the call quality or maintenance. On the basis of the analyses the program attempts to adjust the borders of the service areas of the concerned base stations by means of the power level and channel handover control parameters.

Figure 7:
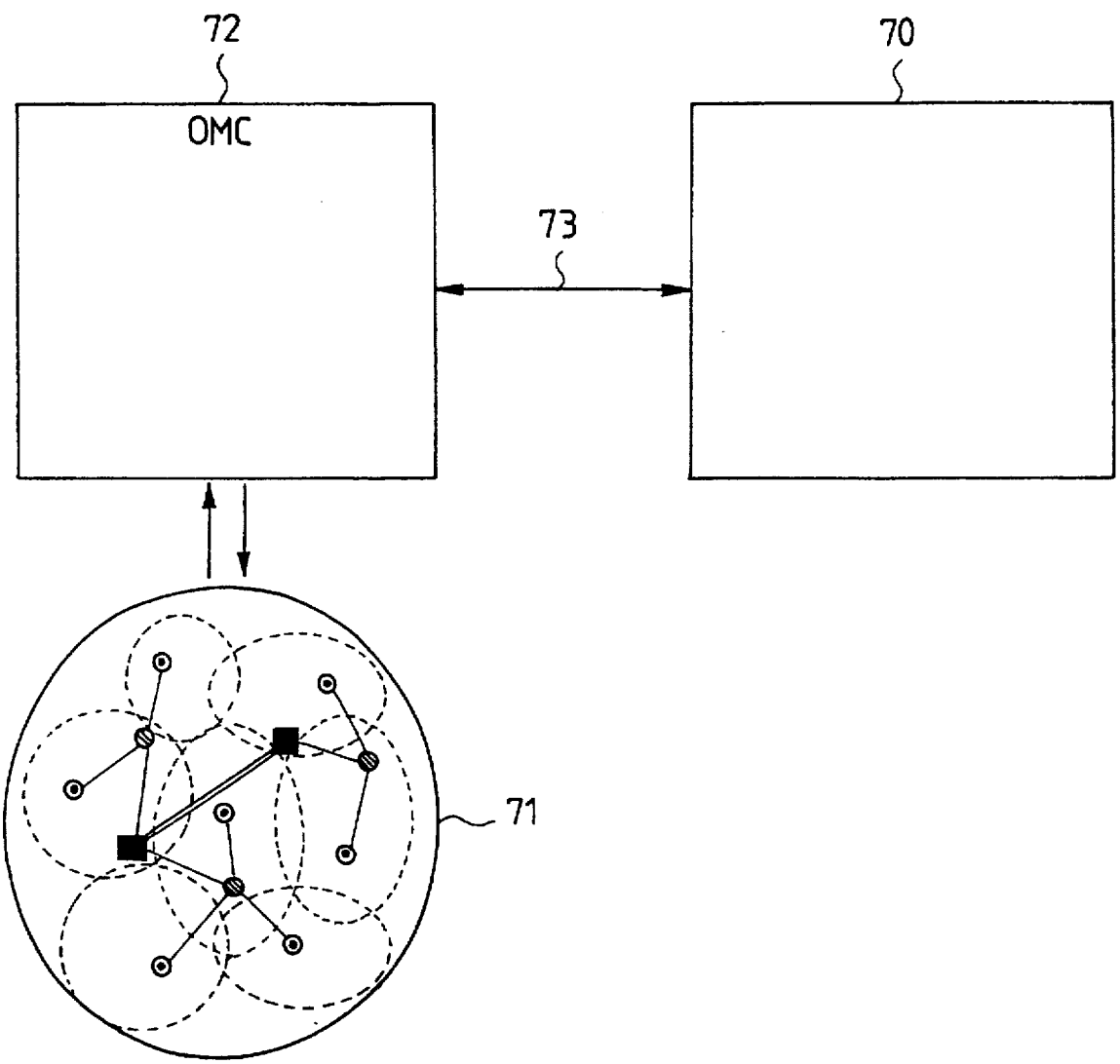
FIG. 7 is a block diagram of the connection of the system according to the invention to an operating cellular network.

When simulating an operating, actual cellular network, information can be continuously provided for the system according to the invention, by utilizing the statistics of the operating network, and the performance of the network can be monitored by means of the simulations performed by the system, so that optimal network structure, configuration and control parameters in view of the operational performance of the network can be found. These optimal values can be set or applied to the operating cellular network either manually or automatically. As shown in FIG. 7, the system 70 according to the invention may have an interface 73 to an operation and maintenance center OMC 72 of a GSM cellular network 71, e.g., an OMC commercially available from Nokia Cellular Inc., the OMC providing information to the system 70 on the operation of the network 72 and enabling the system 70 to alter the network configuration, e.g., control parameters. So the operation of the cellular network 71 can be optimized continuously in accordance with current conditions. When the system 70 of the invention employs the above-mentioned autonomous analysing applications and applies optimized parameter values automatically to the OMC 72, a cellular network capable of fully automatic adaptation is achieved.

The figures and the description related to them are only intended to illustrate the invention, which may vary in its details within the scope of the attached claims.

I claim:

1. A method for planning a cellular radio network having a traffic control process, parameters, and a radio environment, comprising;

creating a network model representing the cellular network and its radio environment on a digital map;

adding system properties affecting the traffic control process of the cellular radio network in connection with said network model representing the cellular radio network and its radio environment for a route-specific operational simulation of the cellular radio network, including a plurality of simulation events; and optimizing the parameters of the cellular radio network and operationally optimizing the cellular network on the basis of statistical simulation results describing the operation of the cellular radio network.

2. A method according to claim 1, further comprising:

adding a traffic density model in connection with the model representing the cellular radio network and its radio environment, the traffic density model comprising a subscriber mobility model; and using at least one of immobile and mobile individual subscribers generated on the digital map in said simulation.

3. A method according to claim 1 including:

storing said simulation events separately for each street, location, network element and/or cause.

4. A system for planning a cellular radio network, comprising:

an interactive means for creating a model representing the cellular radio network and its radio environment on a digital map comprising terrain and topology information, said model comprising at least base station locations and antenna locations, antenna powers and antenna directions thereof so defined that radio coverage areas calculated on the basis of a predetermined radio signal propagation model and the information provided by the digital map cover entirely a desired geographical area;

a means for generating active subscribers to be positioned it respective locations on the digital map and radio links established by said active subscribers for simulating said model;

a means for determining at least field strength and interference conditions at each location of each generated active subscriber during the respective radio link in said model of the radio environment created on the digital map;

a means for simulating system functions associated with base station selection, base station handover, channel allocation and active connection control of the subscribers generated by the generating means on the basis of said determined field strength and interference conditions and in accordance with selected system control algorithms and parameters of the cellular radio network;

a means for storing event data of functions performed by the simulating means; and means for changing said system control parameters on basis of results of said simulation.

5. A system according to claim 4, wherein:

said generating means is arranged to generate active subscribers by means of a random process based on at least one of actual call statistics and subscriber penetration of said area.

6. A system according to claim 4, wherein:

said generating means is arranged to generate active subscribers moving in a street network of the digital map by a random process based on actual street-specific traffic amount statistics.

7. A system according to claim 4, wherein:

said generating means is arranged to assign to each generated subscriber an independent initial speed, direction and connection time on the basis of predetermined statistical random functions.

8. A system according to claim 4, further comprising:

means for statistically processing event data stored in said storing means and for graphically presenting event statistics of a graphic user interface of said changing means.

9. A system according to claim 4, wherein:

said changing means includes means for enabling an operator to select and process graphic statistical presentations of a graphic user interface.

10. A system according to claim 4, further comprising:

an interface to a real operating cellular network for receiving information about the operation of said real network for use in said simulation.

11. A system according to claim 4, further comprising:

an interface to a real operating cellular network for altering parameters of said network manually or automatically based on said simulation.

12. A control system for a cellular radio network comprising:

means for obtaining statistical data of operation of an operating cellular network having a radio environment;

means for altering control parameters of the cellular network on the basis of said obtained statistical data; said means for altering said control parameters comprising:

means for storing a model of the cellular radio network and said radio environment on a digital map comprising terrain and topology information, the model comprising at least base station locations and antenna locations, antenna powers and antenna directions of the cellular network;

a means for generating active subscribers at respective locations on the digital map and radio connections established by said active subscribers according to said statistical data obtained from the operating cellular network;

a means for determining at least field strength and interference conditions at each location of each generated active subscriber during the respective radio link in said model of the radio environment created on the digital map;

a means for simulating system functions associated with base station selection, base station handover, channel allocation and active connection control of the subscribers generated by the generating means on the basis of said determined field strength and interference conditions and in accordance with system control algorithms and parameters of the cellular radio network;

a means for storing event data of functions performed by the simulating means; and means for changing the system control parameters on basis of results of said simulation.

\* \* \* \* \*

UNITED STATES PATENT AND TRADEMARK OFFICE
CERTIFICATE OF CORRECTION

PATENT NO. : 5,561,841
DATED : October 1, 1996
INVENTOR(S) : Markus Ots

It is certified that error appears in the above-indentified patent and that said Letters Patent is hereby corrected as shown below:

On the title page, item [19], "Markus" should read --Ots--
                          item [75], should read -- Markus Ots--

Signed and Sealed this

Tenth Day of December, 1996

Attest:

BRUCE LEHMAN

*Attesting Officer*                *Commissioner of Patents and Trademarks*